United States Patent Office 2,813,036
Patented Nov. 12, 1957

2,813,036
GLASS BATCH AND METHOD OF PREPARING THE SAME

James P. Poole, Brockway, Pa., assignor to Brockway Glass Company, Inc., Brockway, Pa.

No Drawing. Application January 8, 1954, Serial No. 403,046

9 Claims. (Cl. 106—52)

This invention relates to glass manufacture and more particularly to the preparation, mixing and handling of batches of glass-making ingredients.

It is known in the glass-making art that efficiency in mixing batch ingredients is much lower when the particle sizes of the batch ingredients vary substantially. If the only consideration were efficiency of mixing then, theoretically, the best mixing would be attained with all of the batch particles of the same size. However, the procurement or preparation of ingredients in such form as to achieve this end is economically not feasible.

A more acute and specific problem arises in the preparation of batches for the manufacture of soda-lime glass, among others. It is economically desirable to use what is known in the art as "light ash" as distinguished from the "dense ash" which has been and is normally used as the alkali ingredient in glass batches. The low cost and greater availability of "light ash" has long made it attractive but no practical method of incorporating it in soda-lime or other commercial glass batches has been available.

Its extremely light "blowy" nature not only makes it almost impossible to mix with the other components of the batch but would result in its "blowing out" of the batch during and after mixing, right up to the time when the batch is incorporated with a molten glass batch. The extremely fine particle size and low density of the light ash raises further problems in handling, mixing and feeding techniques due to its tendency to segregate in the mix and ball up into lumps during mixing and afterward with the result that it is carried out of the batch when the batch is fed into the tank, thus causing melting segregation and refractory corrosion.

By way of differentiating between the "dense ash" of prior art glass batches and the "light ash" with which we are concerned in this discussion, the following table indicates representative screen analyses of "dense ash" and "light ash" in terms of the percentage retained on a series of screens of progressively finer mesh:

| Screen | Dense Ash, percent | Light Ash, percent |
|---|---|---|
| On 20 mesh | 0.0 | 0.0 |
| 30 | 7.0 | 1.0 |
| 40 | 19.0 | 0.5 |
| 60 | 38.0 | 3.0 |
| 80 | 20.0 | 6.5 |
| 100 | 7.0 | 15.0 |
| 200 | 7.0 | 48.0 |
| 325 | | 19.0 |
| Through 325 | 2.0 | 7.0 |

Of course mere wetting of the "light ash" would retard its tendency to "blow off" during and after mixing but such wetting is found to aggravate the mixing and handling problem since there is then an even greater tendency to segregation and lumping and the moist batch does not flow freely and is more difficult to feed into the melting tank.

The present invention provides a method whereby all of the above disadvantages normally attending the use of "light ash" are eliminated. Mixing efficiency is actually increased, despite the great disparity in particle size between the soda ash and the other principal ingredients, and no lumping or balling-up occurs. The batch flows freely and none of the soda is carried out of the batch during feeding of the batch to the tank or during melting.

The foregoing result is accomplished by adding a wetting agent to the batch which permits the use of a moist batch without any of the objections which such procedure has heretofore encountered. Various wetting agents may be employed and the wetting agent may be introduced with the dry batch materials if in dry form or with the water if in liquid form.

The amount of wetting agent to be used depends on the type and concentration thereof and whether it is in dry or liquid form. By way of example, a wetting agent comprising 40 percent active alkyl aryl sulfonate in dry flake form is effective in concentrations from about one ounce per ton of dry batch and upward. The amount of wetting agent should be kept as low as possible without loss of effectiveness for reasons of economy.

In the example here being set forth the amount of water to be added to the batch is from 3 to 8 percent by weight of the dry batch where one ton of batch contains about 300 pounds of light ash. The amount of water to be added to the batch varies depending upon the batch composition and the particle sizes of the ingredients, the main controlling factors in the present instance being the amount and fineness of the soda ash. The water, whether it contains the wetting agent or whether it is added to a dry batch containing a wetting agent in dry form, may be added to the batch by spraying thereon during the early stages of mixing.

Reference has been made herein to the use of "light ash" in glass batches since this presents an acute problem which has long been unanswered in the glass-making art. However, other important advantages are attained by the procedure and method of the present invention. The use of water and wetting agent as indicated above makes it possible to get good mixing with a wide variety of glass batches containing other glass making materials varying widely in particle sizes. Thus particle sizes may be used which have until now been considered impossible even though great cost savings in material and processing were known to be attainable if such materials could be employed satisfactorily.

These new and unusual results are made possible because the combined presence of moisture and wetting agent in the batch prevents segregation of the batch constituents after mixing and still permits the mixed batch to flow readily, thus greatly facilitating handling and feeding. A certain amount of objectionable segregation has always been present even with currently used particle sizes and those skilled in the glass making art have tolerated this condition as unavoidable even though moderately objectionable. The present procedure also greatly reduces the tendency of extremely fine particles of the batch to carry out of the batch in the form of dust. Thus the present invention provides a mixing and handling procedure which is of substantial advantage not only with great and unusual particle size ranges but also where only normal and usual materials and particle size ranges are employed.

A specific example in the case of a batch containing about 300 pounds of light ash per ton of dry batch employs 3 ounces of 40% alkyl aryl sulfonate to one ton of dry batch with 100 pounds of water (5 percent of the dry batch). This allows a sufficient excess of wetting agent to provide a margin of safety since the minimum requirements are somewhat critical. The amount of wetting agent used depends directly on the amount of water used. Wetting agents are available in concentrations of active alkyl aryl sulfonate or equivalent active ingredients up to 100 percent and the amount of wetting agent will vary inversely as the concentration varies and would therefore be less in purer forms.

What is claimed is:

1. The method of preparing and mixing batches of glass making ingredients including soda ash at least some of which is of a light blowy nature which comprises adding to the glass ingredients a wetting agent and water in quantities sufficient to retard segregation of the ingredients and to prevent blowing off of relatively finely divided low density soda ash ingredients.

2. The method of preparing and mixing batches of glass making ingredients including soda ash at least some of which is of a light blowy nature which comprises adding to the glass ingredients a wetting agent in an amount which is equivalent to at least one ounce of an alkyl aryl sulfonate wetting agent per ton of dry batch and water in a quantity of from 3 to 8 percent by weight of the dry batch.

3. The method of preparing and mixing batches of glass making ingredients including soda ash at least some of which is of a light blowy nature which comprises adding to the glass ingredients water in a quantity of from 3 to 8 percent by weight of the dry batch and an alkyl aryl sulfonate wetting agent in a quantity sufficient to retard segregation and lumping of the moistened batch ingredients.

4. The method of preparing and mixing batches of glass making ingredients including soda ash at least some of which is of a light blowy nature which comprises adding to the glass ingredients water in a quantity of from 3 to 8 percent by weight of the dry batch and an organic wetting agent in a quantity sufficient to retard segregation and lumping of the moistened batch ingredients.

5. The method of preparing and mixing batches of glass making ingredients including soda ash at least some of which is of a light blowy nature which comprises adding to the glass ingredients an alkyl aryl sulfonate wetting agent and water in quantities sufficient to retard segregation of the ingredients and to prevent blowing off of relatively finely divided low density soda ash ingredient.

6. A batch for making soda-lime type glass consisting essentially of sand, alkali and lime in the usual proportions, at least some of the alkali comprising soda ash of a relatively light nature, water in a quantity sufficient to produce general moistening of the batch, and an organic wetting agent in an amount sufficient to retard lumping of the moistened batch.

7. A batch for making glass consisting essentially of a plurality of glass making ingredients in desired proportions and of various particle sizes, said ingredients including soda ash as an essential ingredient, at least some of said soda ash being of a relatively light nature, water in a quantity sufficient to produce general moistening of the batch, and an organic wetting agent in an amount sufficient to retard lumping of the moistened batch.

8. A batch for making glass consisting essentially of a plurality of glass making ingredients in desired proportions and of various particle sizes, said ingredients including soda ash as an essential ingredient, at least some of said soda ash being of a relatively light nature, water in a quantity of from 3 to 8 percent by weight of the dry batch, and an organic wetting agent in an amount sufficient to retard lumping of the moistened batch.

9. A batch for making soda-lime type glass consisting essentially of sand, alkali and lime in the usual proportions, the alkali constituent comprising soda ash of a relatively light blowy nature, water in a quantity sufficient to wet the soda ash, and a synthetic organic wetting agent in an amount sufficient to retard the lumping tendency of the wet ash constituent.

References Cited in the file of this patent

UNITED STATES PATENTS

| 2,168,286 | Eustis et al. | Aug. 1, 1939 |
| 2,333,830 | Toone | Nov. 9, 1943 |
| 2,695,249 | Sweo et al. | Nov. 23, 1954 |